Patented Oct. 16, 1934

1,976,774

UNITED STATES PATENT OFFICE 1,976,774

CHEWING GUM PRODUCT

Carleton Ellis, Montclair, N. J., assignor to Standard Oil Development Company

No Drawing. Application September 29, 1931
Serial No. 565,823

5 Claims. (Cl. 99—11)

This invention relates to a chewing gum product comprising either the complete chewing gum composition itself or a chewing gum base containing a resinous body of petroleum origin constituting a part of the chewing or masticable portion. Such resinous material preferably being a synthetic resin.

The synthetic resin preferably employed herein is one which has a hydrocarbon character and is therefore unsaponifiable. This quality of unsaponifiability is regarded as advantageous in chewing gum stock in view of improved stability attained thereby.

The synthetic resin preferably is obtained by the heat treatment of a petroleum oil which normally is free or substantially free of resins but which by subjection preferably repeatedly to elevated temperatures and especially at high pressures is converted in part into resinous bodies. These resinous substances can then be concentrated by distillation of naphtha and oils present, yielding a tarry product which contains a resin admixed with asphaltic substances and some heavy oily material.

To obtain from this tarry product the resin in a state of considerable purity, that is, substantially free from heavy oils, asphalt and similar contaminations, the tarry product may be subjected to a special distillation, preferably in high vacuum to eliminate the oil. The de-oiled material may then be extracted with a light hydrocarbon solvent of the resin but which has substantially no solvent action on the asphaltic substances. A solution of the synthetic resin quite free of these asphaltic substances thus may be obtained which if desirable may be given an acid and/or clay treat and the solvent removed by distillation.

After removal of the solvent there remains a reddish-yellow or reddish-brown resin suitable for employment in a chewing gum, a chewing gum base, and the like, in accordance with the present invention.

As an illustration, gas-oil substantially free of resin, is passed through a heating coil where the oil is heated to about 860°–900° F. under 500–750 pounds superatmospheric pressure, light products of the naphtha type and gases which are formed being removed and the heavier portions being recycled to accomplish repeated exposure to the high temperature, until, by heat reconstitution a high degree of resistance to further change by heating is attained. During this heat treatment some of the hydrocarbons are converted to resin and the resinous bodies thus synthesized dissolved in the resulting tarry oil.

This gas-oil synthetic resin is a fixed, substantially undistillable solid, while the oil in which it is dissolved is capable of undergoing distillation and therefore may be substantially completely removed from the resin. Since the oil has a relatively high boiling point, distillation in high vacuum as previously noted is desirable.

At this point it is appropriate to mention that various crude oils such, for example, as Panuco and Colombian, when subjected to straight run distillation and therefore not exposed to the polymerizing and resinifying heat treatment accorded to the gas-oil procedure illustrated above, do not exhibit any sharp drop in the distillation curve up to the very stage where only solids such as asphalt remain. The components of the majority of crude oils are such that as distillation advances toward the point where only solids (at ordinary temperature) remain in the still, heavier and still heavier and more wax-like oils continue to come over. There is no sharp gap separating the highest boiling oily material from the solids themselves. Therefore a sharp separation of oil from solid is difficult, if not impossible.

By heat-treating to reconstitute as illustrated above, the gas-oil does not produce a series of hydrocarbons of boiling points ranging gradually upwards to merge or shade finally into the resin stage. Instead, oil distils freely under vacuum, then a temperature is reached at which oil ceases to pass over into the condenser. This stage constitutes a sort of end-point indicating that the solids have been freed of oil.

The de-oiled solids are then treated with a resin solvent, preferably a light petroleum naphtha which is practically without solvent action on asphaltic bodies. Thus light gasoline, casinghead naphtha, and even somewhat heavier grades of naphtha may be used. Another agent which may be used to effectively keep asphaltic bodies out of solution is liquefied propane or mixtures of liquefied propane and ethane as extraction agents for the resin. Likewise naphtha may be charged with propane and/or ethane under high pressures.

In many cases heating may be required to bring the resin completely into solution and secure a more rapid and thorough extraction from the asphaltic bodies.

After such extraction and filtration or otherwise separating from the asphaltic material, the solution of gas-oil synthetic resin may be given an acid and clay treatment to eliminate traces of asphalt and discoloring bodies.

Evaporation of the solvent yields the solid resin in a state ready to be used in making the various chewing gum products of the present invention.

From the tarry product obtained by the polymerizing and resinifying treatment of the gas-oil described above there may be obtained various yields of the gas-oil synthetic resin but preferably operation is conducted to yield about 10 per cent of this resin based on the tarry material treated.

A grade of gas-oil synthetic resin made in this manner exhibited the following characteristics.

Softening point by the ball and ring
  determination _____ 180–200° F.
Oil boiling under 350° C. (662° F.)
  and 1 mm. pressure_____ None
Asphaltenes _____ None
Resin _____ 100%

Hence an oil-free resin freed from the objectionable discoloring action of asphalt can be obtained in a simple and cheap manner by synthesis from petroleum.

A gas-oil synthetic resin of this character has the very distinct advantages over oil-containing (greasy) resins of high melting point, in its freedom from greasiness and from asphalt discoloration.

Having first prepared a synthetic resin from petroleum the resin may be incorporated with rubber, rubber latex, chicle, gutta percha, balata and the like to form a chewing gum base. This base may be modified if desired by the addition of various softening agents and the like, including petrolatum, beef stearin, hydrogenated oil, stearic acid, paraffin or ceresin wax and also oxidized paraffin wax and the like. The proportion of the synthetic resin in the base usually is about one-fourth to one-half of the total weight; for example, one-third resin, one-third rubber, or other elastic material capable of being used in products for chewing, and one-third softening agent. The materials of this description are prepared by mixing in an apparatus such as a pill mixer. A rubber suitable for the purpose is jelutong which may be used with its full content of natural resin thereby increasing the proportion of resin and yielding a mixed resinous material, namely the synthetic resin of petroleum origin and the natural resin from the rubber. Employed in this way the actual content of rubber in the chewing gum base will be diminished owing to the presence of the jelutong resin. If desired, other resins having the proper qualities of freedom from odor and taste may be blended and incorporated in the composition.

The chewing gum base having been prepared, the next step is to incorporate sugar and flavoring oils to produce chewing gum. For this purpose 20 parts by weight of chewing gum base, 65 parts powdered sugar and 15 parts of glucose syrup (approximately 44° Bé.) are used. The preferable way of mixing is to place the base in a mixer of the Werner-Pfleiderer type heating by means of a warming jacket until the mass is at a temperature of about 50°–55° C. The glucose syrup is added and then the powdered sugar is introduced gradually until it is taken up in the mass and a well-mixed material results. At any suitable time during the mixing oil of peppermint, spearmint, wintergreen or whatever flavor may be desired is added in proportion as may be required. It is desirable not to heat the composition during the mixing to a temperature at which the rubber becomes too soft, as difficulty may arise through granulation or "breaking" with the result that the composition appears imperfectly compounded.

After the mixture as above has been secured, the mass is allowed to cool somewhat, when it is rolled into sheets and cut into strips or otherwise fabricated such as being sugar-coated and the like to produce various chewing gum and confectionery products. Generally speaking it is desirable to allow the mass from the mixer to remain in a cool room in an atmosphere of conditioned air to prevent absorption of moisture unduly from the atmosphere.

To satisfy the requirements of the chewing gum industry a resin employed in a chewing gum composition must be free from any objectionable odor and unpleasant taste. The preferred form of resin set forth herein, being treated in the manner described and free from oily bodies, is tasteless and does not impart to the chewing gum any odor or taste. In this connection it should be noted that some resins which seem odorless and tasteless by themselves will be found, in a finished chewing gum, to have imparted either an odor or taste which proves objectionable. The preferred resin of the present invention does not, in the finished chewing gum, make its presence known in any such way.

Another desirable property in a resin to be used with rubber, rubber latex, chicle and the like is that it permits the finished chewing gum mass to set quickly. Some resins exerting a pronounced solvent action on the rubbery component cause tackiness which remains in evidence for a long period. This disturbs the operations of sheeting, cutting and wrapping. The preferred resin of the present invention has desirable qualities from the standpoint of a setting-up agent, permitting a relatively quick hardening of the mass so that sheeting and cutting may be carried out without undue delay.

The invention has been illustrated from the standpoint of a gas-oil synthetic resin but I do not limit myself to this particular resin, being able to employ other resins from petroleum both synthetic and natural, these being deodorized to render substantially tasteless and odorless as required in accordance with the foregoing.

Since the color of the chewing gum generally speaking should match a definite standard I prefer to bleach the darker colored petroleum resins to obtain a brown or reddish-brown, yellow or reddish-yellow material which may be employed freely in the chewing gum base without detriment to color. In some products it may not be necessary to meet the color standard, for example, in the chewing gum product known as "Bubble Gum". Rubber latex may be used with the reddish or reddish-brown resins of darker shades, often without objectionable discoloration of product.

The heavy oil distillate derived in the step of preparing the gas-oil synthetic resin, substantially oil-free may be resinified also to yield a synthetic resin, the use of which is within the purview of this invention. For example, by treatment of such oil or fractions thereof with naphthalene and aluminum chloride a resin is obtained which is somewhat lighter in color than the customary reddish-brown shades obtainable in the preparation of the gas-oil synthetic resin. The resin thus synthesized from the oil, properly purified to eliminate any objectionable constituents, may be used in the production of chewing gum base as for example in a manner similar to that previously described.

Thus the present invention is concerned with chewing gum, including chewing gum base, containing a resin, preferably synthetic, of petroleum origin, preferably one generated by heat treatment and preferably derived from gas-oil resinification, said resin in the preferred form being substantially odorless and substantially tasteless, oil- and asphalt-free, substantially unsaponifiable and normally possessing a softening point lying within the limit of 140°–200° F., such preferred form of resin being incorporated with rubber, gutta percha and the like or similar elastic material conferring chewability, with or without softening agents, to form a chewing gum base from which chewing gum is formed by incorporation of a sweetening agent, preferably a mixture of dry cane sugar and a glucose syrup, proportioning the dry sugar to the syrup such that a minimum amount of moisture is introduced into the finished gum.

What I claim is:

1. A chewing gum base comprising a hydrocarbon resin of petroleum origin.

2. A chewing gum base comprising a synthetic hydrocarbon resin of petroleum origin.

3. A chewing gum comprising a sweetening agent, a flavoring agent, rubbery material conferring chewability and a setting-up hydrocarbon resin of petroleum origin.

4. A chewing gum comprising extensible material conferring chewability, a synthetic hydrocarbon resin of petroleum origin of a substantially odorless and tasteless character and a mixture of cane sugar and glucose; said mixture being in major proportion.

5. A chewing gum comprising extensible material conferring chewability; a hard brittle hydrocarbon resin of petroleum origin of a substantially odorless and tasteless character; a mixture of cane sugar and glucose, said mixture being in major proportion; and flavoring material: the chewing gum composition containing said resin of petroleum origin being substantially unmodified in flavor as a result of the presence of said resin.

CARLETON ELLIS.